(12) United States Patent
Hanzel

(10) Patent No.: US 7,677,626 B2
(45) Date of Patent: Mar. 16, 2010

(54) MULTI-FUNCTIONAL VEHICLE TAILGATE

(75) Inventor: Andrew J. Hanzel, Washington, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 99 days.

(21) Appl. No.: 11/876,806

(22) Filed: Oct. 23, 2007

(65) Prior Publication Data

US 2009/0102216 A1   Apr. 23, 2009

(51) Int. Cl.
*B62D 33/027* (2006.01)
(52) U.S. Cl. .................... 296/26.11; 296/61
(58) Field of Classification Search ............. 296/26.01, 296/26.08, 26.11, 50, 51, 57.1, 61
See application file for complete search history.

(56) References Cited

U.S. PATENT DOCUMENTS

| | | | |
|---|---|---|---|
| 4,076,301 A | | 2/1978 | Gergoe |
| 4,596,417 A | * | 6/1986 | Bennett ........................ 296/61 |
| 5,518,158 A | | 5/1996 | Matlack |
| 5,816,638 A | * | 10/1998 | Pool, III ................... 296/26.11 |
| 5,918,925 A | | 7/1999 | Perrin |
| 5,971,464 A | | 10/1999 | Davis et al. |
| 5,988,725 A | * | 11/1999 | Cole ........................... 296/61 |
| 6,120,076 A | | 9/2000 | Adsit et al. |
| 6,158,797 A | * | 12/2000 | Bauer ........................... 296/61 |
| 6,227,593 B1 | * | 5/2001 | De Valcourt ............. 296/26.08 |
| 6,471,279 B2 | | 10/2002 | Pommerset |
| 6,644,708 B1 | * | 11/2003 | Grzegorzewski et al. ...... 296/32 |
| 6,811,067 B2 | | 11/2004 | Muizelaar et al. |
| 6,994,363 B2 | | 2/2006 | Seksaria et al. |
| 7,070,220 B1 | | 7/2006 | Lantaigne |
| 7,080,868 B2 | * | 7/2006 | McClure et al. ............... 296/50 |
| 7,458,624 B1 | * | 12/2008 | Bower et al. ................... 296/61 |
| 2001/0004155 A1 | | 6/2001 | Decker et al. |
| 2006/0001288 A1 | | 1/2006 | Thiele et al. |
| 2006/0208519 A1 | | 9/2006 | King |
| 2006/0232089 A1 | | 10/2006 | Drabik et al. |
| 2007/0262602 A1 | * | 11/2007 | Nagle ........................... 296/51 |

* cited by examiner

*Primary Examiner*—H Gutman
(74) *Attorney, Agent, or Firm*—Quinn Law Group, PLLC

(57) ABSTRACT

A deployable multi-functional tailgate apparatus forms a ramp platform and bulkhead piece, and is stowable against and deployable from an inner surface of a dual-action tailgate door which is usable as a swinging or a drop-style tailgate door. A damping mechanism controls the rate of descent of the platform. The bulkhead piece seals against the vehicle body when deployed to form a barrier, and secures a piece of cargo. A door assembly has a dual-action tailgate door and a multi-functional tailgate apparatus, with the apparatus being deployable as a ramp platform for accessing the rear cargo area when the tailgate door is used as a swinging-style tailgate door, and to form a bulkhead piece for transporting a piece of cargo external to the rear cargo area when the tailgate door is used as a drop-style tailgate door.

14 Claims, 6 Drawing Sheets

US 7,677,626 B2

MULTI-FUNCTIONAL VEHICLE TAILGATE

TECHNICAL FIELD

The present invention relates to a multi-functional vehicle tailgate apparatus for use with a dual-action tailgate door, i.e. a tailgate door that is useable alternately as a swinging-style or drop-style tailgate door, with the multi-functional tailgate apparatus deployable as a ramp platform or a bulkhead piece as desired.

BACKGROUND OF THE INVENTION

Pickup trucks and sport utility vehicles (SUVs) provide greater utility for some purposes in relation to smaller passenger cars, due in part to advantages provided by their greater relative size and weight. These advantages broaden the range of cargo that may be towed by or transported by the vehicle. For example, pickup trucks and SUVs are typically designed to carry relatively heavy machinery, construction materials, and/or recreational vehicles such as three-wheel or four-wheel all-terrain vehicles (ATVs), motorcycles, or snowmobiles.

To accommodate the loading and unloading of such items, as well as to assist vehicle occupants in entering and exiting the elevated rear cargo area or bed of the vehicle, pickup trucks and SUVs often utilize one or more entry-assist mechanisms. For example, ingress to and egress from a rear cargo area, and the loading and unloading thereof, may be facilitated by using a ramp positioned between a stationary ground surface and the floor of the cargo area. Ramp devices may be transported within the cargo area, and then securely clamped or bolted to the floor when needed. However, such ramp devices may be less than optimal for certain purposes. For example, transportable ramp devices are generally limited to such a ramp function, and usually consume as least a portion of the available space within the cargo area. Also, separate detachable ramp platforms may have limited functionality.

SUMMARY OF THE INVENTION

Accordingly, a vehicle is provided having a rear cargo area with a dual-action tailgate door. The dual-action of the tailgate door is provided by selectively pivoting the tailgate door in one direction to form a swinging-style tailgate door, and in another direction to form a drop-style tailgate door. A deployable multi-functional apparatus is deployable from and stowable adjacent to an inner surface of the tailgate door, with the apparatus being selectively adjustable to alternately form a plurality of different tailgate devices.

In one aspect of the invention, the different tailgate devices include a ramp platform for accessing the rear cargo area when the tailgate door is pivoted to form a swinging-style tailgate door, and a bulkhead piece for transporting a piece of cargo external to the rear cargo area when the tailgate door is pivoted to form the drop-style tailgate door.

In another aspect of the invention, the ramp platform has a feature for securing the ramp platform to the vehicle when deployed.

In another aspect of the invention, the ramp platform has a damping mechanism operable for controlling a rate of descent of the ramp platform as one end of the ramp platform descends toward a stationary surface external to the vehicle.

In another aspect of the invention, the damping mechanism includes a pulley device operatively connecting the ramp platform with the tailgate door.

In another aspect of the invention, the bulkhead piece seals against a pair of sidewalls of the rear cargo area when deployed and when the tailgate door is used as a drop-style tailgate door, to thereby form a weather-resistant barrier to the rear cargo area, and is configured for securing a piece of cargo positioned adjacent to the tailgate door and the bulkhead piece.

In another aspect of the invention, a tailgate door assembly is provided for a vehicle having a body defining a rear cargo area and a floor. The tailgate door assembly includes a tailgate door adapted to form a swinging-style tailgate door when pivoted in one direction, and a drop-style tailgate door when pivoted in another direction. A multi-functional tailgate apparatus is connected to an inner surface of the tailgate door, and is deployable in one direction to form a ramp platform for accessing the rear cargo area when said tailgate door is used as said swinging-style tailgate door. The apparatus is deployable in another manner to form a bulkhead piece for facilitating the transport of a piece of cargo external to the rear cargo area when the tailgate door is used as a drop-style tailgate door.

In another aspect of the invention, a multi-functional tailgate apparatus is provided for a vehicle having a rear cargo area. The assembly has a deployable portion and a fixable portion adapted for continuous connection to a dual-action tailgate door forming either a swinging-style tailgate door or a drop-style tailgate door.

In another aspect of the invention, the deployable portion forms a ramp platform for accessing the rear cargo area when the dual-action tailgate door is used as a swinging-style tailgate door, forms a bulkhead piece for facilitating transport of a piece of cargo external to the rear cargo area when the dual-action tailgate door is used as a drop-style tailgate door.

In another aspect of the invention, the deployable portion has a slip-resistant surface on one side and an appearance surface on another side. The slip-resistant surface is presented when the ramp platform and bulkhead portion are deployed, and the appearance surface is presented when the deployable portion is stowed, with the slip-resistant surface securing a piece of cargo transported on the drop-style tailgate door.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
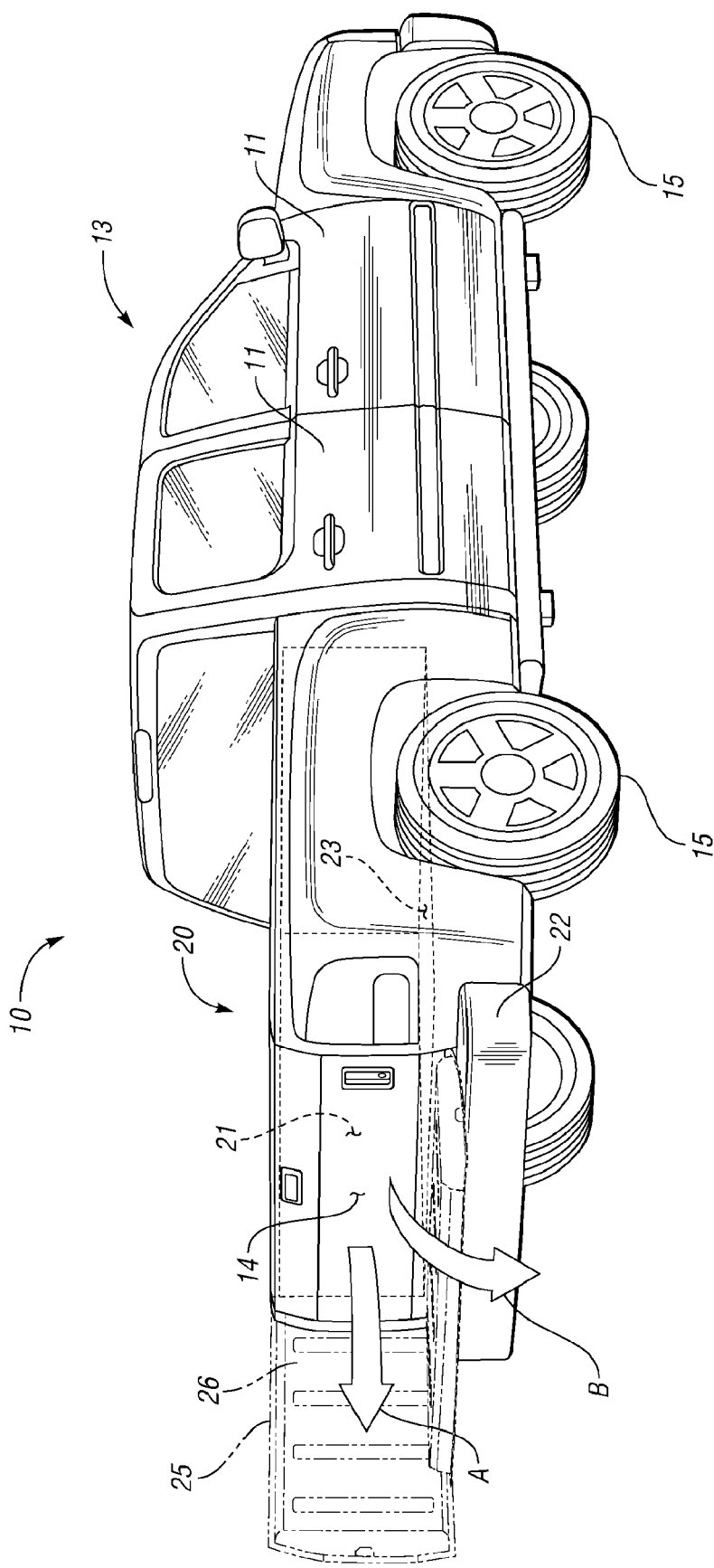
FIG. 1 is a schematic perspective illustration of a vehicle having a dual-action tailgate door and a multi-functional tailgate apparatus according to the invention.

Referring to the drawings wherein like reference numbers correspond to like or similar components throughout the several figures, in FIG. 1 a vehicle 10 is represented as a pickup truck, but the vehicle 10 may also take the form of a sport utility vehicle (SUV), crossover vehicle, station wagon, or other vehicle having a rear cargo area 20. Vehicle 10 has a plurality of wheels 15 and a passenger compartment 13 having a set of passenger doors 11 suitable for accessing the passenger compartment 13. Rear cargo area 20 has a floor 23 that is bounded by side walls 21 extending rearward from the passenger compartment 13 toward a vehicle bumper 22, with the rear cargo area 20 suitably configured and/or constructed to carry or transport a predetermined load in accordance with the particular design and intended purpose of vehicle 10.

The rear cargo area 20 is operatively attached to a dual-action tailgate door 14 of the type known in the art. As used herein, the term "dual-action" refers to the capability of the tailgate door 14 to swing, move, or pivot in more than one direction. For example, the tailgate door 14 is configured to selectively swing or pivot outwardly in the direction of arrow A to form a side-swinging tailgate door, and is also configured to selectively swing or pivot downwardly in the direction of arrow B to form a drop-style tailgate door, depending on how a user of vehicle 10 unlatches and moves tailgate door 14. To enable the tailgate door 14 to operate or pivot in both directions, the tailgate door 14 is adapted to include a first set of latches, pivots, and/or or hinges 24A (see FIG. 2) positioned with respect to the tailgate door 14 at least one sidewall 21, and a second set of substantially identical latches, pivots, and/or hinges 24B (see FIG. 3) positioned with respect to the floor 23. The tailgate door 14 has an inner surface 25, i.e. a major surface oriented toward the rear cargo area 20, and is connected to a multi-functional tailgate device 26, as will be described in detail later hereinbelow.

Figure 2:
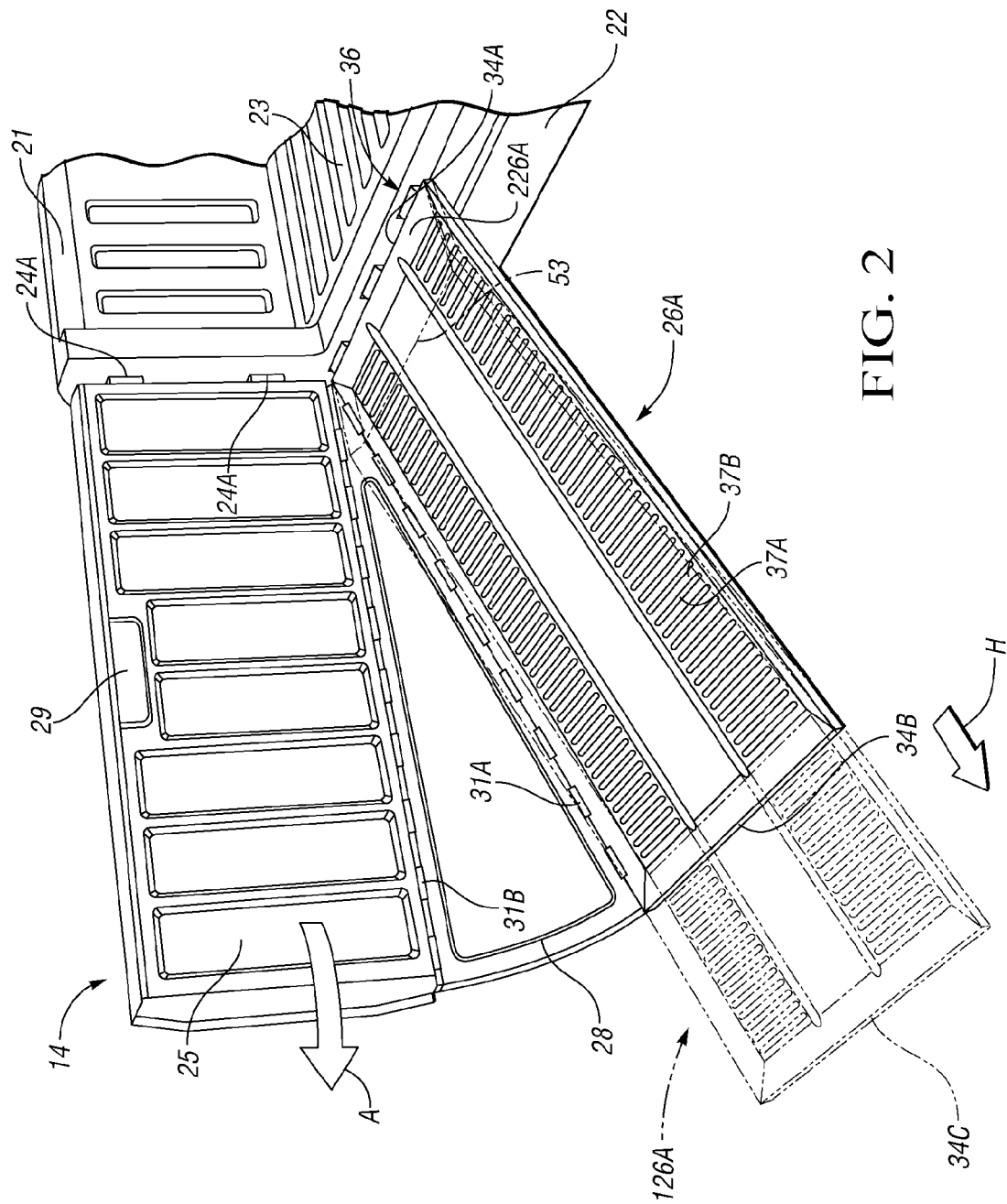
FIG. 2 is a schematic perspective illustration of the multi-functional apparatus attached to the vehicle of FIG. 1 to form a ramp platform.

Referring to FIG. 2, the tailgate door 14 is shown as fully opened in the direction of arrow A as a swinging-style tailgate door, described above, and with multi-functional tailgate device 26 (see FIG. 1) unlatched from tailgate door 14 using a suitable latch mechanism 29, and fully deployed as a ramp platform 26A, as will be described later herein. In one embodiment, a series of ramp hinges 31A are operatively connected to ramp platform 26A and a main hinge portion 28, with the main hinge portion 28 operatively connected to the tailgate door 14 using another set of substantially identical ramp hinges 31B.

Figure 5A:
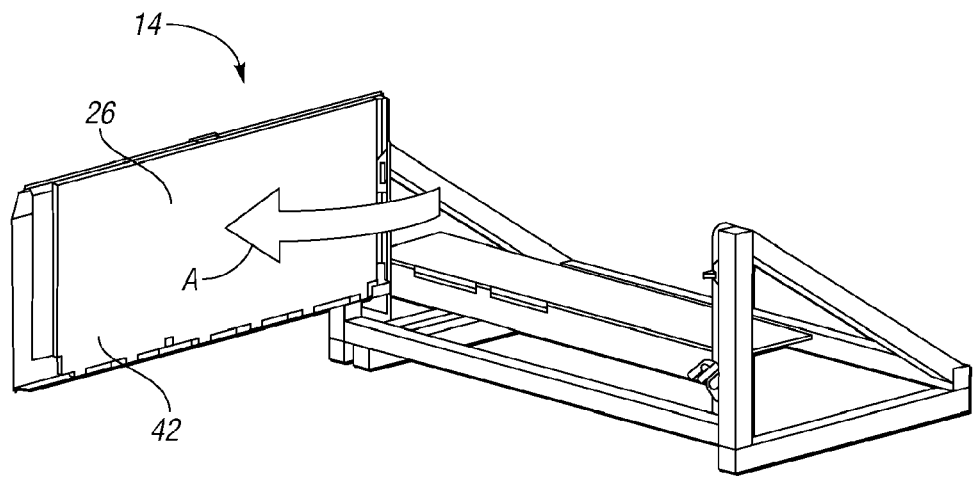
FIG. 5A is a perspective illustration of the tailgate door used as a swinging-style tailgate door, with the multi-functional tailgate apparatus in a stowed position.
Figure 5B:
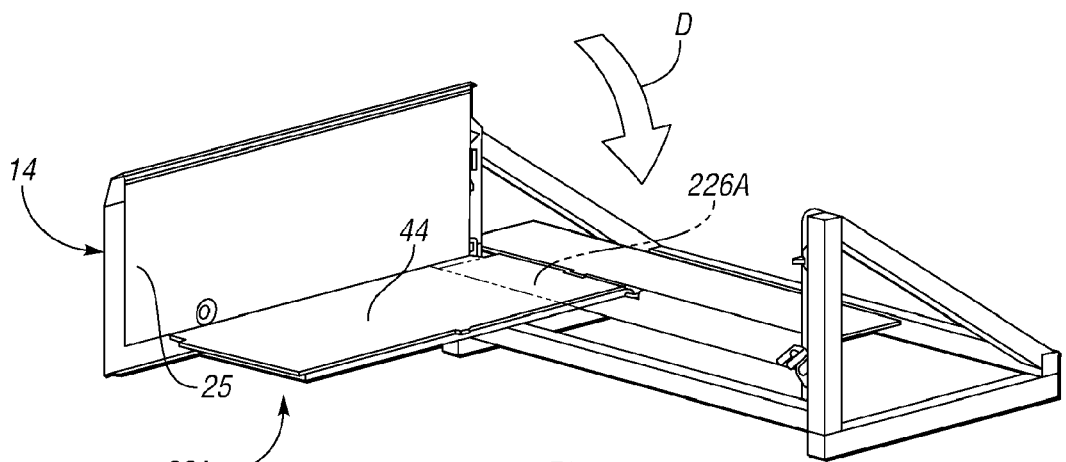
FIG. 5B is a perspective illustration of the tailgate door of FIG. 5A with the multi-functional tailgate apparatus in a partially deployed position as a ramp platform.
Figure 5C:
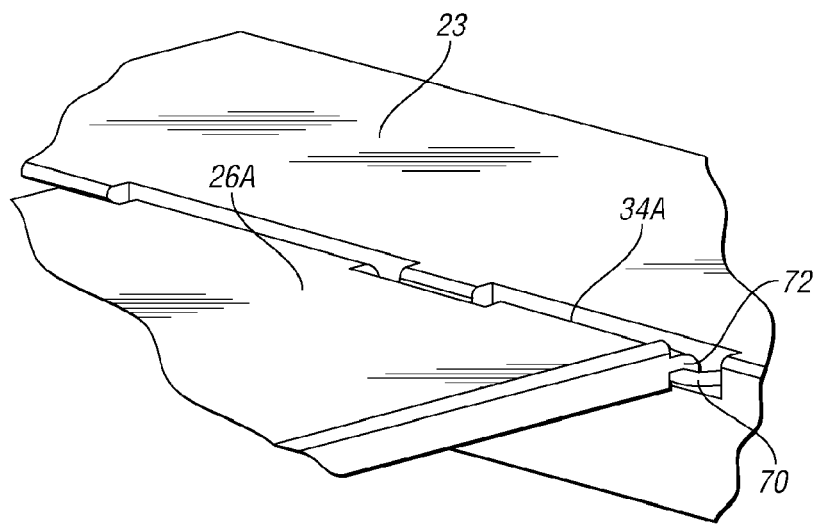
FIG. 5C is a perspective illustration of the multi-functional tailgate apparatus of FIG. 5B showing a connection of the apparatus to the floor of the vehicle of FIG. 1.

One end 34A of ramp platform 26A, which alternately may be a hinged end portion 226A of the ramp platform 26A connected to the rest of ramp platform 26A via a hinge 53 or similar device, is secured to the floor 23 of the vehicle 10 (see FIG. 1) using a mounting feature 36, such as the mating hooks 72 and bars 70 shown in Figure 5C. The other end 34B of ramp platform 26A rests on the ground or another stationary surface (not shown). Alternately, ramp platform 26A may be configured with an extendable ramp portion 126A having an end 34C, as shown in phantom, with the extendable ramp portion 126A being extendable from the ramp platform 26A in the direction of arrow H and end 34C being configured substantially identically to end 34B, and likewise resting on the ground or another stationary surface (not shown). The ramp portion 126A is also retractable in the opposite direction, i.e. back toward and into the ramp platform 26A, for example into an internal cavity thereof (not shown). Using the extendable ramp portion 126A, one may extend the ramp portion 26A and thereby lower the angle the ramp platform 26A forms with respect to the floor 23.

Ramp platform 26A is constructed of rugged, light-weight material providing sufficient traction, and includes a series of alternating ribs 37A and a textured surface or friction surface 37B, such as to assist climbing and resist sliding with respect to ramp platform 26A. Slip resistance and traction may alternately be provided using waffle patterns, studs, bumps, and/or other suitable friction-enhancing surface features.

Figure 3:
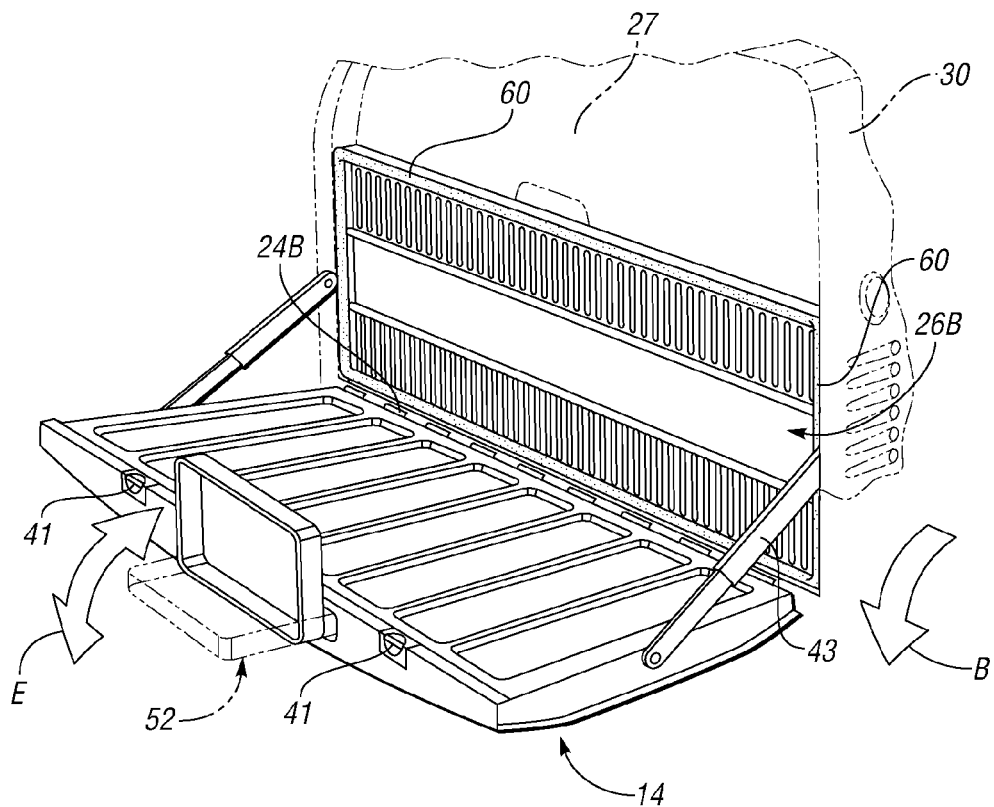
FIG. 3 is a schematic perspective illustration of the multi-functional apparatus attached to the vehicle of FIG. 1 to form a bulkhead piece.
Figure 3A:
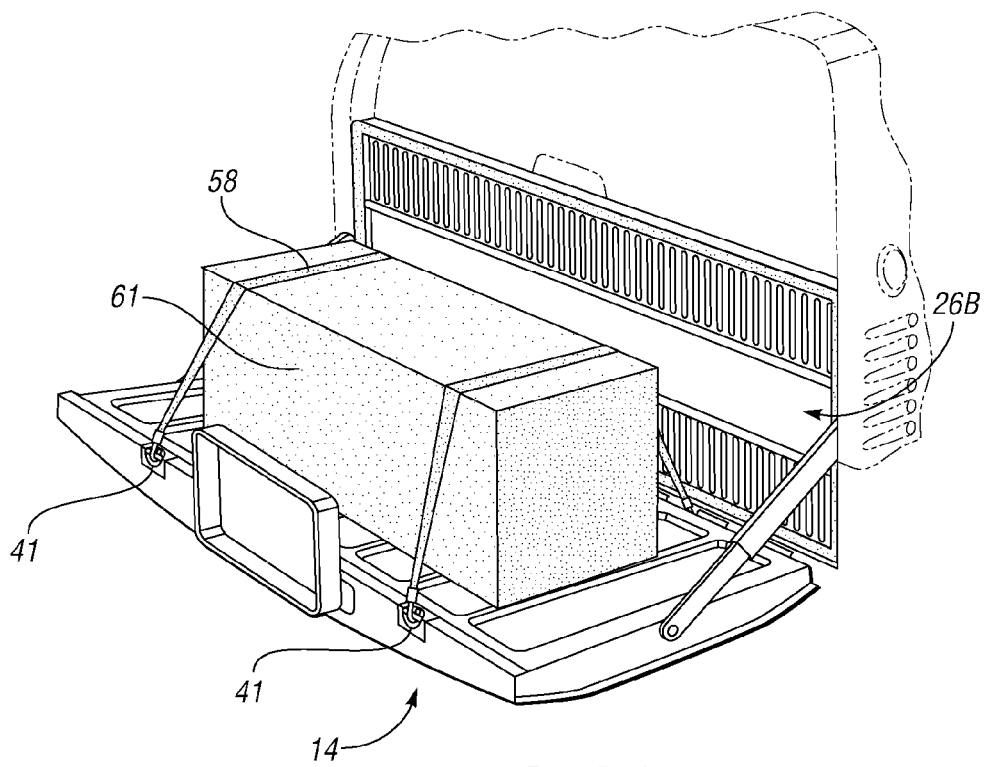
FIG. 3A is a schematic perspective illustration of the multi-functional apparatus of FIG. 3 deployed as a bulkhead piece, and a piece of cargo being transported on tailgate door adjacent to the bulkhead piece.

Referring to FIGS. 3 and 3A, the tailgate door 14 is shown in an open position as a drop-style tailgate door, described above, and with multi-functional device 26 (see FIG. 1) deployed as a bulkhead piece 26B. Tailgate door 14 may be operatively attached to an adjustable license plate 52, such that when the tailgate door 14 forms a drop-style tailgate door as shown in FIGS. 3 and 3A, the license plate 52 may be adjusted as needed, as represented by arrows E, thus making the license plate 52 clearly visible while tailgate door 14 forms a drop-style tailgate door as shown.

Tailgate door 14 and/or bulkhead piece 26B are configured to include a variety of devices for facilitating transport of a piece of cargo 61 positioned external to vehicle 10 (see FIG. 1) at a position adjacent to the tailgate door 14 and bulkhead piece 26B. Such devices include a pair of locking brackets 43 or other similarly functioning devices adapted to prevent the tailgate door 14 from closing, as well as a plurality of anchors 41 positioned at convenient locations on the periphery of the tailgate door 14. Anchors 41 are adapted to facilitate the connecting of a cord, rope, or strap 58 thereto as needed to secure a piece of cargo 61. It will be understood that the number and/or placement of anchors 41 may be reversed or modified, or other suitable anchoring or connecting devices substituted therewith, within the scope of the invention.

When the vehicle 10 (see FIG. 1) is configured with a rear cargo bed roof 30 and a rear window or lift glass 27, such as a permanent roof structure or a removable cap, a seal 60 is provided between bulkhead piece 26B and the lift glass 27 and any portion of vehicle 10 (see FIG. 1) against which the bulkhead piece 26B may adjacently seal when deployed. Seal 60 is shaped and formed from a sufficient weather-resistant material such as rubber or expanded polymer foam, to form a weather-resistant barrier to rear cargo area 20 (see FIG. 1) when the bulkhead piece 26B is deployed.

Figure 4A:
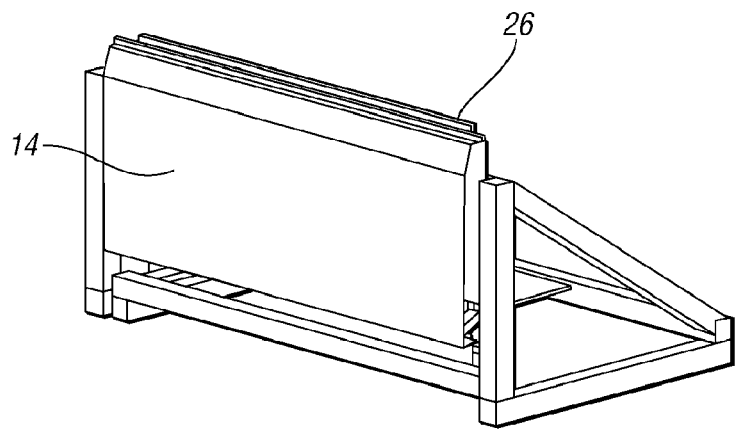
FIG. 4A is a schematic perspective illustration of the multi-functional apparatus and dual-action tailgate door in a closed position.
Figure 4B:
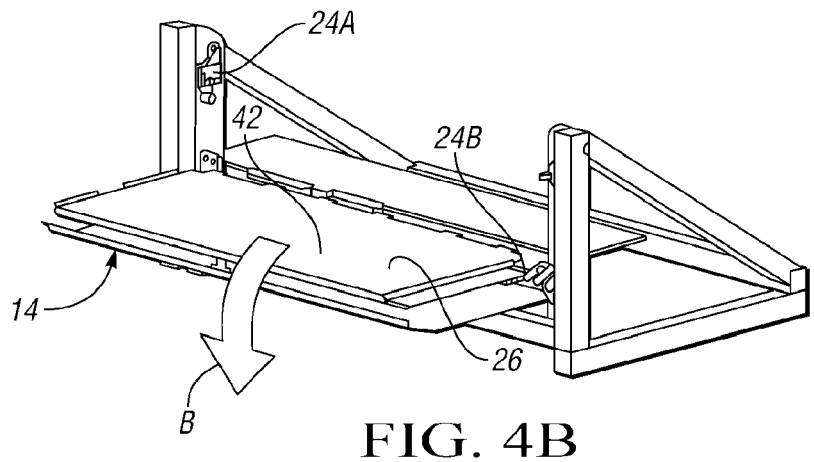
FIG. 4B is a schematic perspective illustration of the dual-action tailgate door when used as a drop-style tailgate door, with the tailgate door in an open position and the multi-functional tailgate apparatus in a stowed position.
Figure 4C:
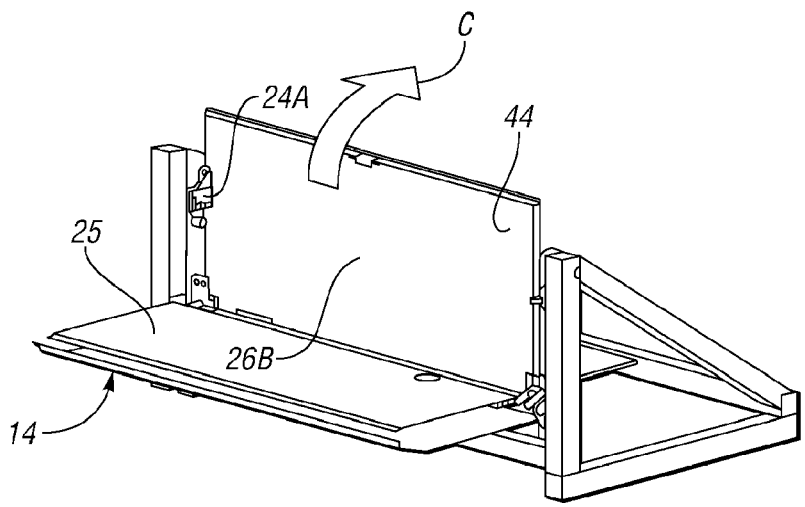
FIG. 4C is a schematic perspective illustration of the tailgate door and apparatus of FIG. 4B with the multi-functional tailgate apparatus deployed as a bulkhead piece.

Referring to FIGS. 4A through 4C, a series of schematic perspective views are shown of tailgate door 14 with multi-functional tailgate device 26 in its various stages of opening and deployment, respectively, to form a bulkhead portion 26B (see FIG. 3) once deployed. In each of FIGS. 4A through 4C, tailgate door 14 and tailgate device 26 (and bulkhead piece 26B) are shown detached from the vehicle 10 for clarity.

Beginning with FIG. 4A, the tailgate door 14 is shown in a fully closed position, with the tailgate device 26 stowed as described above. Next, FIG. 4B shows tailgate door 14 opened in the direction of arrow B to form a drop-style tailgate door. Tailgate device 26 remains stowed against the tailgate door 14 and presenting an appearance surface 42. Appearance surface 42 as used herein refers to a non-work surface, i.e. a surface that may be configured and/or finished consistent with the intended design of the vehicle 10 (see FIG. 1).

In FIG. 4C, the tailgate device 26 of FIGS. 4A and 4B is fully deployed to form a bulkhead piece 26B as described above, and is locked into place using a sufficient locking mechanism or latch assembly (not shown) within or in proximity to hinges 24A. In the position shown in FIG. 4C, i.e. with the bulkhead piece 26B deployed in the direction of arrow C, a slip-resistant surface 44 is presented, i.e. a surface sufficiently configured to form the ramp platform 26A (see FIG. 2) and bulkhead piece 26B (see FIGS. 3 and 3A) described above. Bulkhead piece 26B may work in conjunction with the open tailgate door 14 to transport or secure a piece of cargo 61 (see FIG. 3) external to the vehicle 10 (see FIG. 1), as described previously hereinabove. In such a configuration, additional cargo-carrying capacity may be gained, and/or internal space may be freed up, without resorting to use of a roof-rack.

Referring to FIGS. 5A through 5C, a schematic perspective view is shown of tailgate door 14 with multi-functional tailgate device 26 in its various stages of opening and deployment as a ramp platform 26A. In each of FIGS. 5A through 5C, only tailgate door 14 and tailgate device 26 (and ramp platform 26A) are shown for clarity, unless otherwise indicated.

Beginning with FIG. 5A, the tailgate door 14 is shown in a fully open position in the direction of arrow A to form a swinging-style tailgate door, with appearance surface 42 presented. Tailgate device 26 remains stowed against tailgate door 14 as described above with reference to FIG. 4B.

Next, FIG. 5B shows tailgate device 26 of FIG. 5A opened in the direction of arrow D to expose inner surface 25 of tailgate door 14 and slip-resistance surface 44, and to form a ramp platform 26A. Ramp platform 26A is secured at an end 34A, which is shown in more detail in FIG. 5C.

In FIG. 5C, ramp platform 26A as described above is secured to the floor 23 at end 34A. To secure ramp platform 26A, ramp platform 26A is configured to include a plurality of hooks 72 that are integrally formed with ramp platform 26A at end 34A, which are each adapted to engage a different one of a plurality of bars 70 that are operatively connected to or formed with the floor 23. Hooks 72 and bars 70 are preferably circular in cross section to permit hooks 72 to rotate with respect to each of the captive bars 70 as the other end 34B (see FIG. 2) of ramp platform 26A is lowered.

Figure 6:
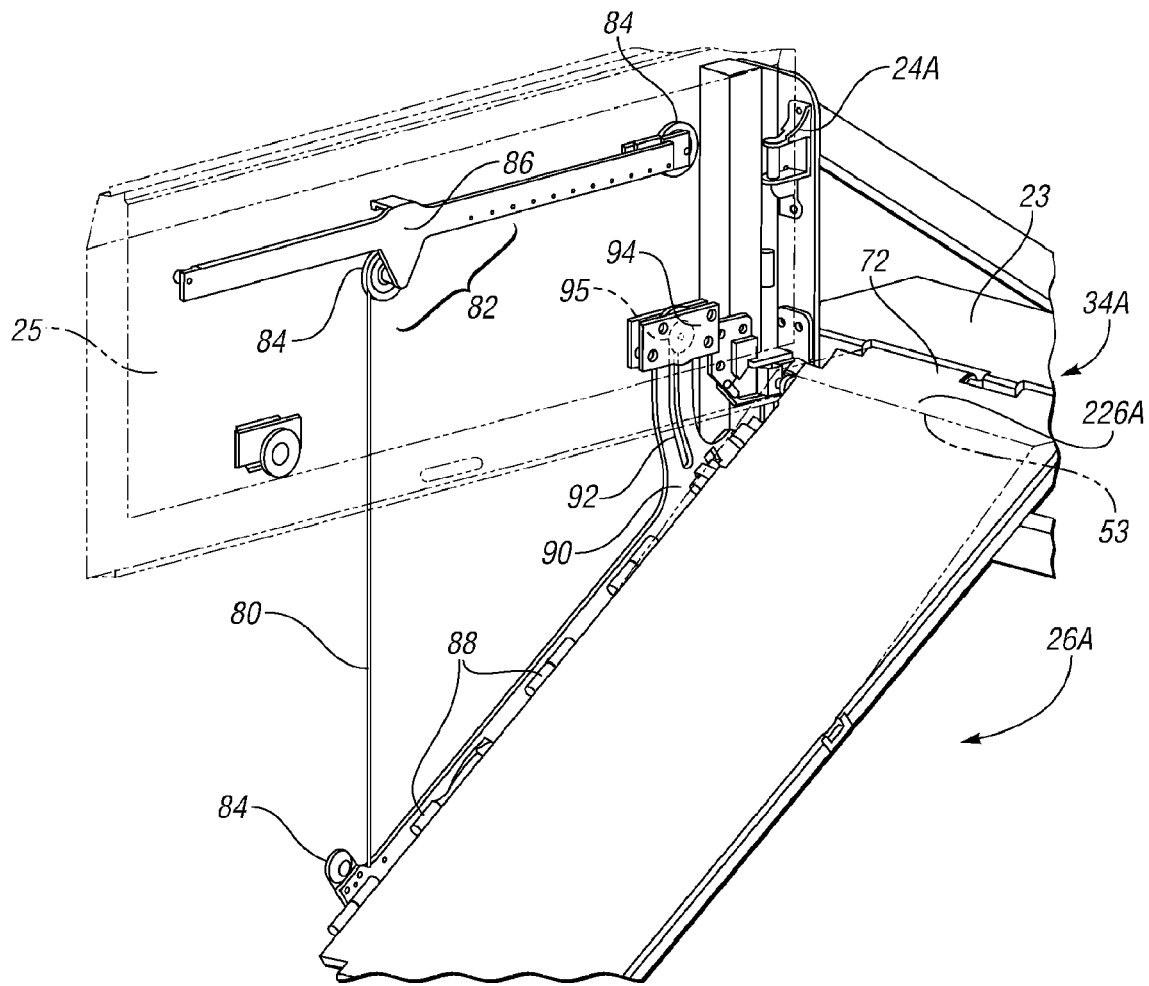
FIG. 6 is a perspective illustration of the ramp platform of FIGS. 2 and 5B and a damping mechanism usable with the ramp platform.

Referring to FIG. 6, a preferred alternative to main hinge portion 28 of FIG. 2 is shown. Ramp platform 26A, and in particular the hinged end portion 226A (see FIG. 6) thereof, is operatively connected to a ramp bracket 90 using a plurality of hinges 88. Hinges 88 are adapted to allow the ramp platform 26A to rotate with respect to hinges 88 and ramp bracket 90. Ramp bracket 90 is supported by a bracket mount 94 that is bolted, welded, or otherwise rigidly connected to tailgate door 14, and that is configured with a slot 92. The slot 92 is adapted to contain a captive roller guide 95 or other suitable locating means that is allowed to move freely within slot 92 as the ramp platform 26A is lifted into a position even with floor 23.

A damping mechanism 82 includes an upper bracket 86, a plurality of pulley wheels 84, and a length of cable 80, with upper bracket 86 being bolted, welded, or otherwise rigidly attached to the tailgate door 14 as shown. Tension on cable 80 therefore slows a rate of descent of one end of the ramp platform 26A as ramp platform 26A is lowered, as will now be described with reference to FIG. 7.

Figure 7:
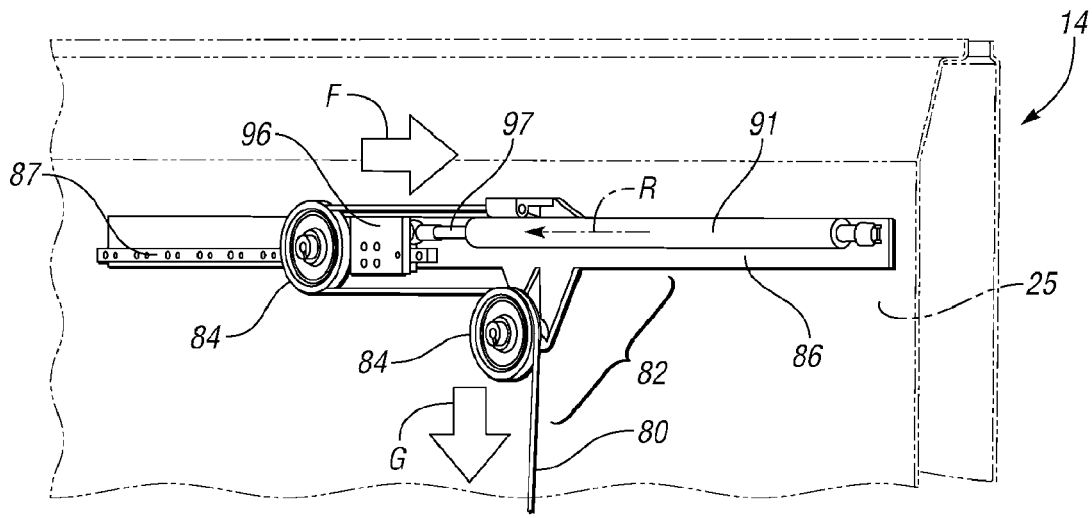
FIG. 7 is a perspective illustration of the damping mechanism of FIG. 6.

Referring to FIG. 7, damping mechanism 82 is shown from the opposite side of the perspective of FIG. 6, i.e. presenting the opposite surface of upper bracket 86. Upper bracket 86 is operatively connected to or formed with a stationary guide rail or track 87 that is adapted to mate with a moveable shuttle car portion 96, which is operable for rolling or sliding in the direction of arrow F in response to an applied force to cable 80 in the direction of arrow G. Pulley wheels 84 are engaged with cable 80 and positioned with respect to a cylinder 91 having an internal piston 97. Piston 97 and cylinder 91 are configured to apply a sufficient return force (arrow R) for slowing the rate of descent of ramp platform 26A (see FIG. 6) as cable 80 moves in the direction of arrow G, i.e. in response to the weight of ramp platform 26A. Likewise, when ramp platform 26A is lifted to its initial position, i.e. parallel to floor 23 (see FIG. 6), the required upward force exerted on ramp platform 26A is reduced by the return force (arrow R) provided by piston 97, thereby facilitating both the stowing and deployment of ramp platform 26A.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
  a body having a plurality of sidewalls defining a rear cargo area, said rear cargo area having a floor;
  a dual-action tailgate door positioned adjacently to said rear cargo area and adapted to selectively pivot in a first direction with respect to one of said plurality of sidewalls as a swinging-style tailgate door, and in a second direction with respect to said floor as a drop-style tailgate door; and
  a deployable multi-functional tailgate apparatus that is selectively adjustable to alternately form a plurality of different tailgate devices, wherein said plurality of different tailgate devices includes a ramp platform for accessing said rear cargo area when said dual-action tailgate door is pivoted in said first direction as said swinging-style tailgate door, and a bulkhead piece adapted for transporting a piece of cargo external to said rear cargo area when said dual-action tailgate door is pivoted in said second direction as said drop-style tailgate door;
  wherein said multi-functional apparatus is adapted for stowage adjacent to an inner surface of said dual-action tailgate door and is deployable therefrom.

2. The vehicle of claim 1, wherein said ramp platform has a feature that is mateable with a separate feature of said body for securing said ramp platform to said body when said ramp platform is deployed.

3. The vehicle of claim 1, wherein said ramp platform is configured with a damping mechanism operable for controlling a rate of descent of an end of said ramp platform.

4. The vehicle of claim 3, wherein said damping mechanism includes a pulley device operatively connecting said ramp platform with said dual-action tailgate door.

5. The vehicle of claim 1, further comprising a seal configured to form a weather-resistant barrier to the rear cargo area when said bulkhead piece is deployed and when said dual-action tailgate door is used as said drop-style tailgate door.

6. A door assembly for a vehicle having a body defining a rear cargo area and a floor, the door assembly comprising:
   a dual-action tailgate door adapted to selectively pivot in a first direction with respect to said rear cargo area to form a swinging-style tailgate door, and in a second direction with respect to said rear cargo area to form a drop-style tailgate door; and
   a multi-functional tailgate apparatus operatively connected to an inner surface of said dual-action tailgate door;
   wherein said multi-functional apparatus is deployable in one manner to form a ramp platform for accessing the rear cargo area when said dual-action tailgate door is used as said swinging-style tailgate door, and in another manner to form a bulkhead piece for transporting a piece of cargo external to the rear cargo area when said dual-action tailgate door is used as said drop-style tailgate door.

7. The door assembly of claim 6, including a first locator portion operatively connected to the floor and a second locator portion operatively connected to said ramp platform, said second locator portion being insertable into and receivable by said first locator portion for securing said ramp platform to said floor when said apparatus is deployed as said ramp platform.

8. The door assembly of claim 6, including a damping mechanism operatively connected to said dual-action tailgate door and said multi-functional tailgate apparatus, wherein said damping mechanism is adapted to slow a rate of descent of said ramp platform as an end of said dual-action tailgate door descends toward a stationary surface external to the vehicle.

9. The door assembly of claim 8, wherein said damping mechanism includes a cable and a piston, said piston being operable for slowing said rate of descent of said ramp platform from an initial position when said piston is moved in one direction, and for exerting a force on said cable to thereby assist in returning said ramp platform to said initial position when said piston is moved in another direction.

10. The door assembly of claim 9, wherein said piston is operatively connected to a plurality of pulley wheels.

11. The door assembly of claim 6, further comprising a seal configured to form a weather-resistant barrier to the rear cargo area when said bulkhead piece is deployed and when said dual-action tailgate door is used as said drop-style tailgate door, and wherein said bulkhead piece is configured with a feature for securing the piece of cargo to said bulkhead piece.

12. A multi-functional tailgate door assembly for a vehicle having a rear cargo area, the assembly comprising:
   a deployable portion;
   a fixable portion adapted for continuous connection to a dual-action tailgate door, said dual-action tailgate door being moveable in one direction as a swinging-style tailgate door, and in another direction as a drop-style tailgate door;
   wherein said deployable portion is deployable from said dual-action tailgate door to deploy a ramp platform for accessing the rear cargo area when said dual-action tailgate door is used as said swinging-style tailgate door, wherein said deployable portion is deployable from said dual-action tailgate door to deploy a bulkhead piece for facilitating transport of a piece of cargo external to the rear cargo area when said dual-action tailgate door is used as said drop-style tailgate door, and wherein said deployable portion is stowable adjacent to a surface of said dual-action tailgate door.

13. The assembly of claim 12, wherein said deployable portion has a slip-resistant surface formed on one side thereof and an appearance surface formed on another side thereof, said slip-resistant surface being presented when each of said ramp platform and said bulkhead piece are deployed, and said appearance surface being presented when said deployable portion is stowed with respect to said dual-action tailgate door, wherein said slip-resistant surface is adapted for securing said piece of cargo to said bulkhead piece when said piece of cargo is transported on said drop-style tailgate door.

14. The assembly of claim 12, including a damping mechanism operatively connectable at one end to one of said fixable portion and said dual-action tailgate door, and at another end to said deployable portion, said damping mechanism having a piston operable for slowing a rate of deployment of said deployable portion.

* * * * *